(12) United States Patent
Cheng et al.

(10) Patent No.: US 11,343,466 B2
(45) Date of Patent: May 24, 2022

(54) VIDEO SIGNAL CONVERSION DEVICE

(71) Applicant: AVerMedia Technologies, Inc., New Taipei (TW)

(72) Inventors: Ssu-Ming Cheng, New Taipei (TW); Hong-Wei Liu, New Taipei (TW); Chen-Hsiang Wu, New Taipei (TW); Shi-Jie Lin, New Taipei (TW); Yen-Cheng Yao, New Taipei (TW); Chih-Sheng Wang, New Taipei (TW)

(73) Assignee: AVERMEDIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 17/095,779

(22) Filed: Nov. 12, 2020

(65) Prior Publication Data

US 2021/0067736 A1 Mar. 4, 2021

Related U.S. Application Data

(62) Division of application No. 16/395,393, filed on Apr. 26, 2019, now Pat. No. 10,868,998.

(30) Foreign Application Priority Data

Apr. 30, 2018 (TW) .................. 107114650

(51) Int. Cl.
*H04N 7/01* (2006.01)
*H04N 5/355* (2011.01)
*H04N 5/235* (2006.01)

(52) U.S. Cl.
CPC ......... *H04N 7/0127* (2013.01); *H04N 5/2355* (2013.01); *H04N 5/355* (2013.01)

(58) Field of Classification Search
CPC ........ H04N 5/2355; H04N 5/355; H04N 5/46; H04N 7/0127; H04N 5/268; H04N 7/0125; G09G 2370/12; G09G 5/005; G09G 2340/0407; G09G 5/006
See application file for complete search history.

(56) References Cited

U.S. PATENT DOCUMENTS

| | | | |
|---|---|---|---|
| 8,836,715 B2 | 9/2014 | Broughton et al. | |
| 10,140,694 B2 | 11/2018 | Park et al. | |
| 10,868,998 B2 * | 12/2020 | Cheng | G09G 5/005 |
| 2006/0147187 A1 | 7/2006 | Takemoto et al. | |
| 2007/0156942 A1 | 7/2007 | Gough | |
| 2007/0186025 A1 | 8/2007 | Boyd et al. | |

(Continued)

FOREIGN PATENT DOCUMENTS

| | | |
|---|---|---|
| CN | 101641952 B | 7/2013 |
| CN | 105611213 A | 5/2016 |

(Continued)

*Primary Examiner* — Paulos M Natnael
(74) *Attorney, Agent, or Firm* — McClure, Qualey & Rodack, LLP (57) ABSTRACT

A video signal conversion device includes a frontend interface circuit, a FPGA video processor and a backend interface circuit. The frontend interface circuit receives a HDR video input signal from a video transmitting device. The FPGA video processor outputs a SDR first video output signal. A video receiving device receives the first video output signal and a HDR second video output signal from the FPGA video processor through the video bridge controller of the backend interface circuit by PCI-E.

17 Claims, 6 Drawing Sheets

(56) References Cited

U.S. PATENT DOCUMENTS

| | | |
|---|---|---|
| 2013/0076978 A1 | 3/2013 | Chang |
| 2013/0093845 A1 | 4/2013 | Bickerstaff et al. |
| 2013/0332922 A1 | 12/2013 | Entezari et al. |
| 2014/0002479 A1 | 1/2014 | Muijs et al. |
| 2014/0022460 A1 | 1/2014 | Li et al. |
| 2014/0210847 A1 | 7/2014 | Knibbeler et al. |
| 2015/0103919 A1 | 4/2015 | Hattori et al. |
| 2015/0245044 A1 | 8/2015 | Guo et al. |
| 2016/0100183 A1 | 4/2016 | Yamamoto et al. |
| 2016/0134832 A1 | 5/2016 | Yamamoto et al. |
| 2016/0142714 A1 | 5/2016 | Toma et al. |
| 2017/0085827 A1 | 3/2017 | Terada et al. |
| 2017/0085894 A1 | 3/2017 | Ramasubramonian et al. |
| 2017/0094344 A1 | 3/2017 | Kozuka et al. |
| 2017/0104973 A1 | 4/2017 | Toma et al. |
| 2018/0302556 A1 | 10/2018 | Baran et al. |

FOREIGN PATENT DOCUMENTS

| | | |
|---|---|---|
| CN | 105979192 A | 9/2016 |
| CN | 106233706 A | 12/2016 |
| CN | 106488157 A | 3/2017 |
| CN | 107004395 A | 8/2017 |
| CN | 107277399 A | 10/2017 |
| TW | 201633779 A | 2/2016 |

* cited by examiner

VIDEO SIGNAL CONVERSION DEVICE

CROSS REFERENCE TO RELATED APPLICATIONS

This application is a divisional application of U.S. application Ser. No. 16/395,393 filed Apr. 26, 2019, now U.S. Pat. No. 10,868,998, which claims priority to Taiwan Application No. 107114650 filed Apr. 30, 2018, the entire contents of which are hereby incorporated by reference.

BACKGROUND

1. Technical Field

The present invention generally relates to a conversion device, and more particularly, to a video conversion device.

2. Description of Related Art

At present, the high dynamic range (HDR) video is getting more and more accepted by the frontend video source device, for example, the video game console PS4 have output game video supporting HDR format. At present, however, in the design of the video product, the backend video manufacturers do not consider whether backend video recovering end supports the HDR formation, for example, during video recording, display and other video application. In this case, for example, when the signal from the frontend to backend (a video receiving end) is the video signal of HDR format but the backend (the video receiving end) does not support the HDR format, the user may easily become aware that the video format fails to meet the caused color anomaly.

Therefore, it is obvious that existing video transmitting device has the problems to be solved.

SUMMARY OF THE INVENTION

The present invention is to provide a video signal conversion device, which is cooperated with a video transmitting device and a video receiving device. The video signal conversion device includes a frontend circuit, a FPGA video processor and a backend circuit. The frontend circuit is electrically connected with the video transmitting device to receive the video input signal from the video transmitting device, where the video input signal is HDR signal. The FPGA video processor is electrically connected with the frontend circuit. According to the video input signal, the FPGA video processor outputs a first video output signal, and the first video output signal is SDR signal. The backend circuit is electrically connected with the FPGA video processor and the video receiving device respectively, wherein, the backend circuit includes a video bridge controller, the video bridge controller is PCI-E BUS, and the video receiving device meets PCI-E BUS format by the video bridge controller to receive the first video output signal from the FPGA video processor.

Therefore, according to the technical content of the invention, the video signal conversion device can more fully solve the problems that the backend video receiving end does not support HDR or the backend video receiving end requires SDR.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

The terminology used herein is for the purpose of describing the particular embodiment and is not intended to limit the application. The singular forms "a", "an", "the", "this" and "these" may also include the plural.

As used herein, "the first", "the second", etc., are not specifically meant to refer to the order, nor are they intended to limit the application, but are merely used to distinguish elements or operations that are described in the same technical terms.

As used herein, "coupled" or "connected" may mean that two or more elements or devices are directly contacted in physical with each other, or indirectly contacted in physical with each other, may also mean that two or more elements or devices operate or interact with each other, and may also refer to a direct or indirect connection by electrical (or electrical signals).

As used herein, "including", "comprising", "having", and the like are all open type terms, meaning to include but not limited to.

As used herein, "and/or" includes any one or all combinations of the recited.

Regarding the directional terminology used herein, for example, up, down, left, right, front or back, etc., only refers to the direction of the additional drawing. Therefore, the directional terminology used is used to illustrate that it is not intended to limit the application.

The terms used in this specification, unless otherwise noted, usually have the usual meaning of each term used in this field, in the context of the application, and in particular content. Certain terms used to describe the present invention are discussed below or elsewhere in this specification to provide additional guidance to those skilled in the art in the description of the present invention.

As used herein, "video input signal" and "video output signal" mentioned in this specification refer to signals containing at least video information, and of course, audio and video signals, and there is no limit here.

A video signal conversion device disclosed in the embodiment may be cooperated with a video transmitting device and a video receiving device. The video signal conversion device includes a frontend interface, a video processing module and a backend interface. The frontend interface is coupled with the video transmitting device to receive the video input signal from the video transmitting device, where the video input signal is high dynamic range signal. The "high dynamic range" is hereinafter referred to as HDR. The video processing module is coupled with the frontend interface. According to the video input signal, the video processing module outputs the first video output signal, wherein the first video output signal is standard display range signal. The "standard display range" is hereinafter referred to as SDR. The backend interface is coupled with the video processing module and the video receiving device respectively, wherein the video receiving device receives the first video output signal from the video processing module by the backend interface.

The video transmitting device may send the HDR video input signal at least, for example, it may only send HDR video input signal, or may send HDR and/or SDR, or other video input signal. The frontend interface may have different designs subject to actual requirement, for example, the video processing module may be operated by the frontend interface and receives the video information of the video input signal from the video transmitting device for subsequent processing. For example, the frontend interface may be the frontend circuit. Additionally, the frontend interface may, for example, include a video receiving device, or a video shunt, which support HDMI or other format videos respectively. According to the conversion signal, the video processing module may, for example, convert the video information of the video input signal into SDR video information to generate SDR first video output signal. The conversion information may be known by comparison tables or real-time operations. For the above conversion, actually, for example, it may be SDR video information obtained by adjusting the video information video conversion formula of the conversion information, and this is only used as example and does not limit this invention. The video processing module may be implemented by software or hardware circuit, for example, a processor, a main control unit (MCU), a system on a chip (SoC), a field programmable gate array (FPGA), etc. The video receiving device may be the device performing video functions, such as display/save/stream/live or video edit/export, and the device realized in a computer or single video function. The video receiving device may be the device supporting or not supporting HDR. The backend circuit may include a video bridge controller, and the video bridge controller may be designed to PCI-E BUS or USB. The video receiving device enables the video processing module by the video bridge controller to convert the HDR video input signal to the SDR first video output signal, for example, the video receiving device transmits relevant command or information to the video bridge controller to control the video processing module for corresponding video processing by the video bridge controller.

Additionally, the video receiving device may receive the first video output signal and/or the second video output signal from the video processing module by the backend interface, wherein the second video output signal is HDR signal. During actual operation, according to the HDR video input signal, the video processing module outputs the HDR second video output signal by pass-through. Of course, according to the HDR video input signal, the video processing module may generate the HDR second video output signal by video operation. These video operations may be, for example, change of resolution/frame rate or other video parameters. Additionally, the video processing module may, for example, substantially synchronously output the SDR first video output signal and the HDR second video output signal, or selectively output the SDR first video output signal or the HDR second video output signal. The detailed description is given below by embodiments.

Figure 1:
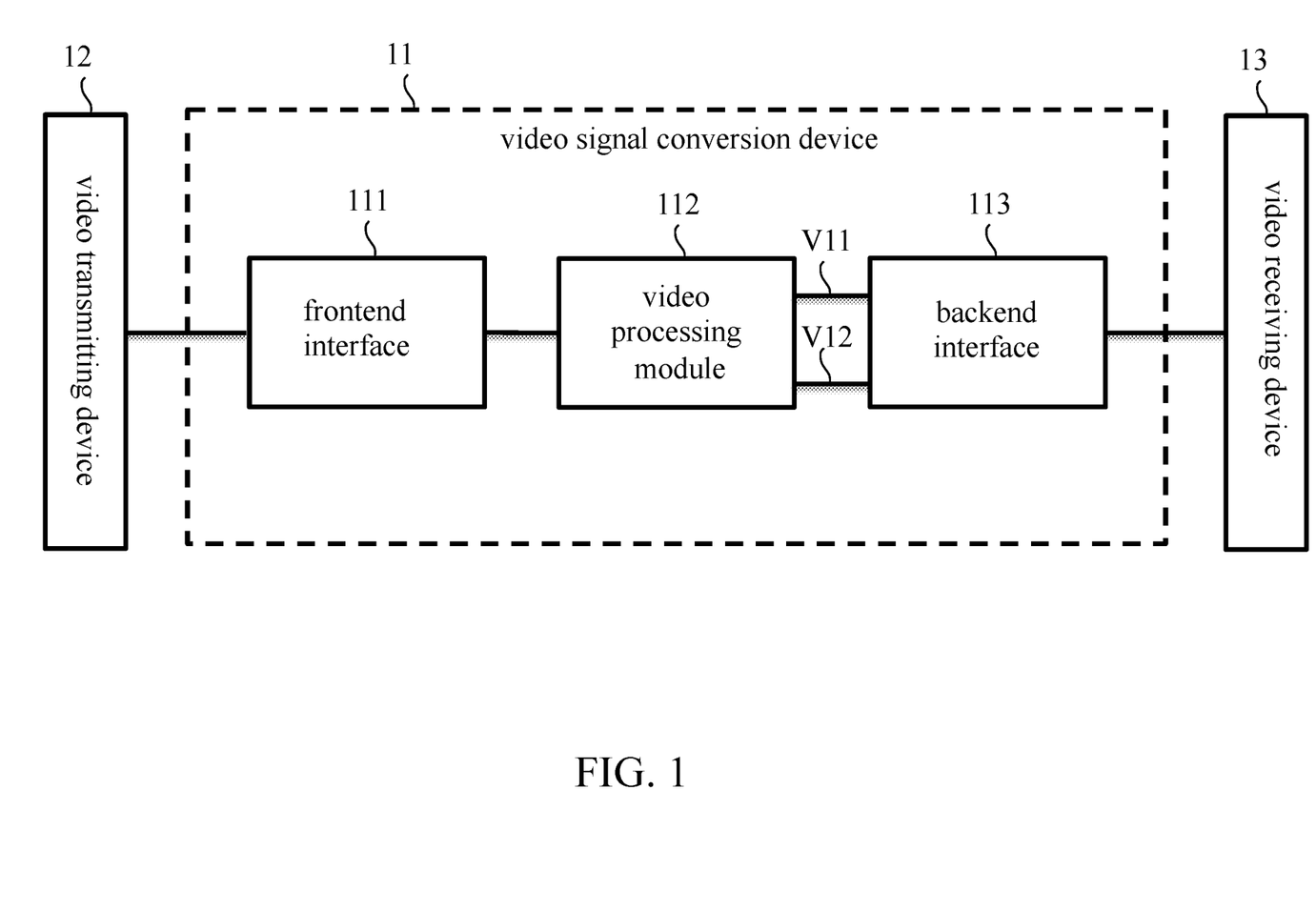
FIG. 1 is a schematic diagram showing a video signal conversion device according to a first embodiment of the invention.

FIG. 1 shows the schematic diagram of the video signal conversion device of the first embodiment. As shown in FIG. 1, the video signal conversion device 11 is used together with the video transmitting device 12 and the video receiving device 13. The video signal conversion device 11 includes a frontend interface 111, a video processing module 112 and a backend interface 113. The frontend interface 111 is coupled with the video transmitting device 12 to receive the video input signal from the video transmitting device 12, wherein the video input signal is HDR signal. The video processing module 112 is coupled with frontend interface 111. According to the video input signal, the video processing module 112 outputs the first video output signal V11, wherein, the first video output signal V11 is SDR signal. The backend interface 113 is coupled respectively with the video processing module 112 and the video receiving device 13, wherein, the video receiving device 13 receives the first video output signal V11 and the second video output signal V12 from the video processing module 112, and the second video output signal V12 is HDR signal.

As according to the video input signal, the video processing module 112 outputs the SDR first video output signal V11 and the HDR second video output signal V12 for the follow-up use by the video receiving device 13, the video receiving device may be more suitable for a plurality of video functions supporting or not supporting HDR. In this embodiment, for example, the SDR first video output signal V11 may be displayed on the screen not supporting HDR, and the HDR second video output signal V12 may be stored for follow-up use. Of course, or, the HDR second video output signal V12 may be displayed on the screen supporting HDR, while the SDR first video output signal V11 may be stored for display in the screen not supporting HDR.

According to the video input signal, the video processing module 112 may output the HDR second video output signal V12. During actual operation, according to the HDR video input signal, the video processing module 112 may output the HDR second video output signal V12 by pass-though. Of course, according to the HDR video input signal, the video processing module 112 may generate the HDR second video output signal V12 by video operation. This video operation may be, for example, change of resolution rate, frame rate or other video parameters. Additionally, the video processing module 112 may, for example, substantially synchronously output the SDR video output signal V11 and the HDR second video output signal V12. The "substantially synchronously" means smaller time difference within allowable range is deemed as "substantially synchronously". In another embodiment, the video processing module 112 may respectively output the SDR first video output signal V11 and the HDR second video output signal V12. The backend interface 113 may respectively or substantially synchronously output the SDR first video output signal V11 and the HDR second video output signal V12 to the video receiving device 13.

Figure 2:
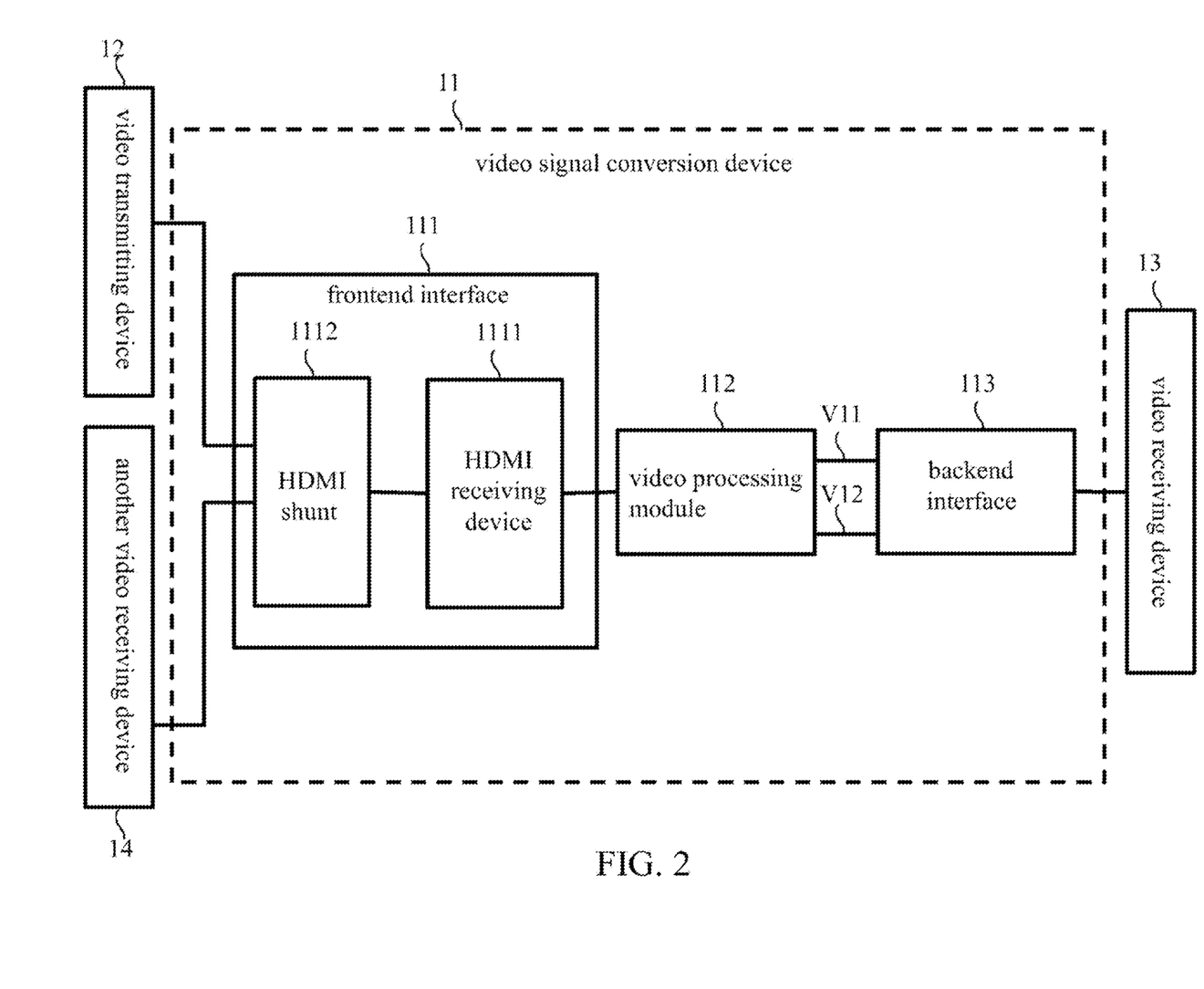
FIG. 2 is a schematic diagram showing a frontend interface of the video signal conversion device according to the first embodiment of the invention.

According to actual requirement, the frontend interface includes a receiving device and a shunt, for example, as shown in FIG. 2, the frontend interface 111 includes a HDMI receiving device 1111 receiving the HDMI video input signal from the video transmitting device 12. The video signal conversion device 11 may be cooperated with another video receiving device 14, wherein, the frontend interface 111 further includes a HDMI shunt 1112, wherein the HDMI shunt 1112 is respectively coupled with the HDMI receiving device 1111, the video transmitting device 12 and the another video receiving device 14 and shunts the video input signal to the HDMI receiving device 1111 and another video receiving device 14. During actual operation, the HDMI shunt 1112 may output the signal by pass-through, or change of the resolution/frame rate or other video parameters, without limitation.

The video receiving device 13 may enable the video processing module 112 by the backend interface 113 to convert the HDR video input signal to the SDR first video output signal V11, for example, the video receiving device 13 transmits relevant command or information to the backend interface 113 to control the video processing module 112 for corresponding video processing by the backend interface 113. Additionally, the video receiving device 13 may also enable the video processing module 112 to substantially synchronously or respectively the SDR first video output signal V11 and the HDR second video output signal V12 by the backend interface 113.

Figure 3:
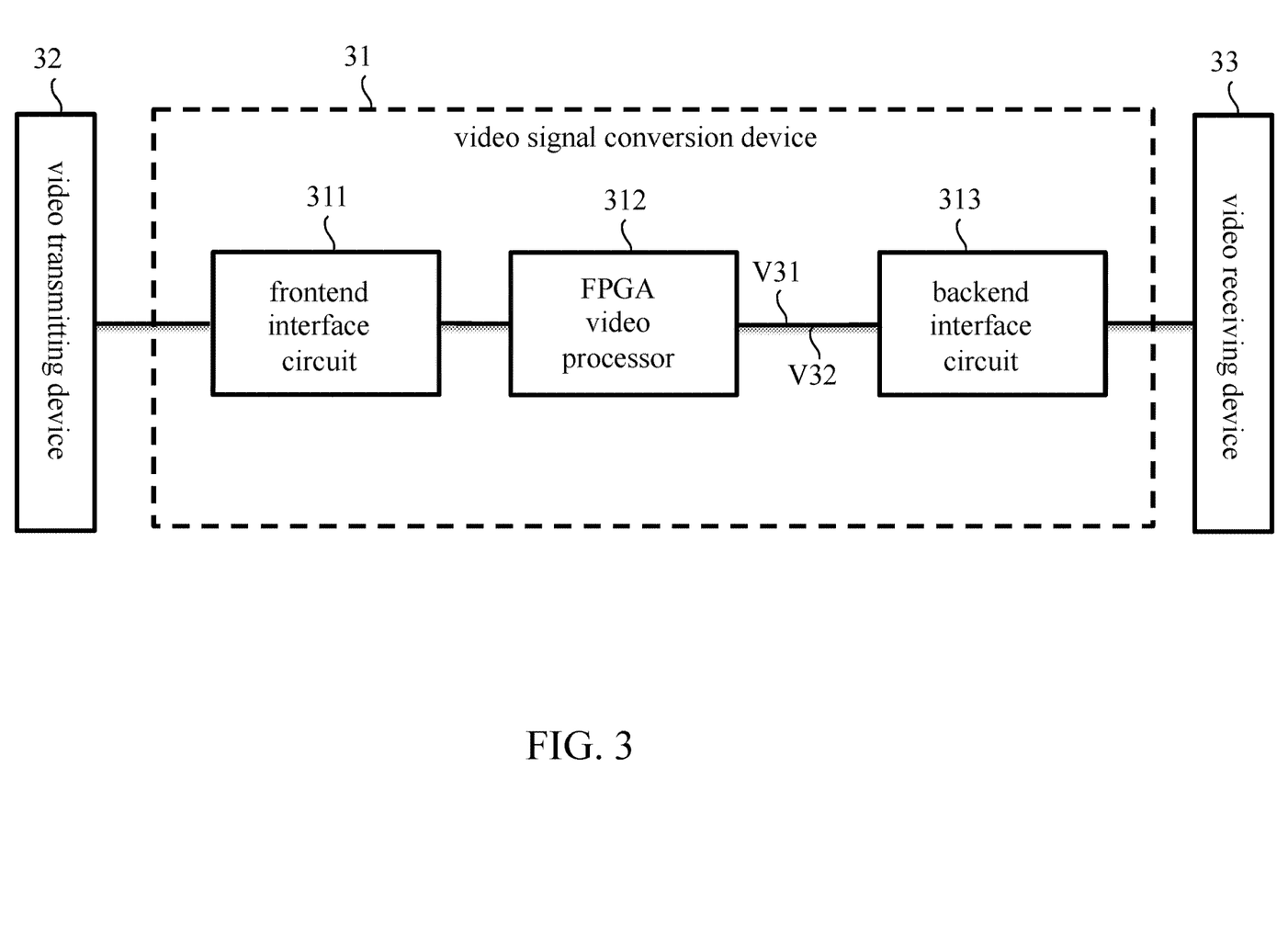
FIG. 3 is a schematic diagram showing a video signal conversion device according to a second embodiment of the invention.

FIG. 3 shows the schematic diagram of the video signal conversion device according to the second embodiment. As shown in FIG. 3, the video signal conversion device 31 is cooperated with the video transmitting device 32 and the video receiving device 33. The video signal conversion device 31 includes a frontend interface 311, a FPGA video processor 312 and a backend circuit 313. The frontend interface 311 is electrically connected with video transmitting device 32 to receive the video input signal from the video transmitting device 32, wherein the video input signal is HDR signal. The FPGA video processor 312 is electrically connected with the frontend circuit 311. According to the video input signal, the FPGA video processor 312 outputs the first video output signal V31, wherein, the first video output signal V31 is SDR signal. The backend circuit 313 is electrically connected with the FPGA video processor 312 and the video receiving device 33, wherein, the backend circuit 313 includes a video bridge controller, and the video bridge controller is PCI-E BUS. The video receiving device 33 receives the PCI-E BUS first video output signal V31 from the FPGA video processor 312 by the video bridge controller. In other embodiments, the FPGA video processor 312 also may be a SoC video processor.

As mentioned above, according to the HDR video input signal, the FPGA video processor 312 outputs the SDR first video output signal V31 for follow-up use by the video receiving device 33, such as storage, display, or series flow, etc., to more fully apply for supporting HDR.

The FPGA video processor 312 may selectively output the first video output signal V31 or the second video output signal V32, wherein the second video output signal V32 is HDR signal. In addition, according to the video input signal, the FPGA video processor 312 outputs the HDR second video output signal V32. During actual operation, according to HDR video input signal, the FPGA video processor 312 outputs the HDR second video output signal V32 by pass-through. Of course, according to the HDR video input signal, the FPGA video processor 312 may generate the HDR second video output signal V32 by video operation. These video operations may be, for example, change of resolution/frame rate or other video parameters. Additionally, the backend circuit 313 may, for example, selectively output the SDR first video output signal V31 or the HDR second video output signal V32 to the video receiving device 33. Of course, a buffer may be arranged on the backend circuit 313. Even if the FPGA video processor 312 selectively outputs the signal V31/V32, by temporary storage in the buffer of the backend circuit 313, the SDR first video output signal V31 and the HDR second video output signal V32 may be respectively or substantially synchronously outputted to the video receiving device 33.

In this embodiment, according to actual requirements, the frontend circuit 311 may have different design, for example, including a HDMI receiving device and a HDMI shunt. The receiving device and the shunt have been described in the previous embodiment, and not are repeated in this embodiment.

The video receiving device 33 may enable the FPGA video processor 312 by the video bridge controller of the backend circuit 313 to convert the HDR video input signal to the SDR first video output signal V31, for example, the video receiving device 33 transmits relevant command or information to the video bridge controller of the backend circuit 313 to control the FPGA video processor 312 for video processing by the video bridge controller of the backend circuit 313. In addition, the video receiving device 33 may enable the FPGA video processor 312 by the video bridge controller of the backend circuit 313 to selectively output the SDR first video output signal V31 or the HDR second video output signal V32.

Figure 4:
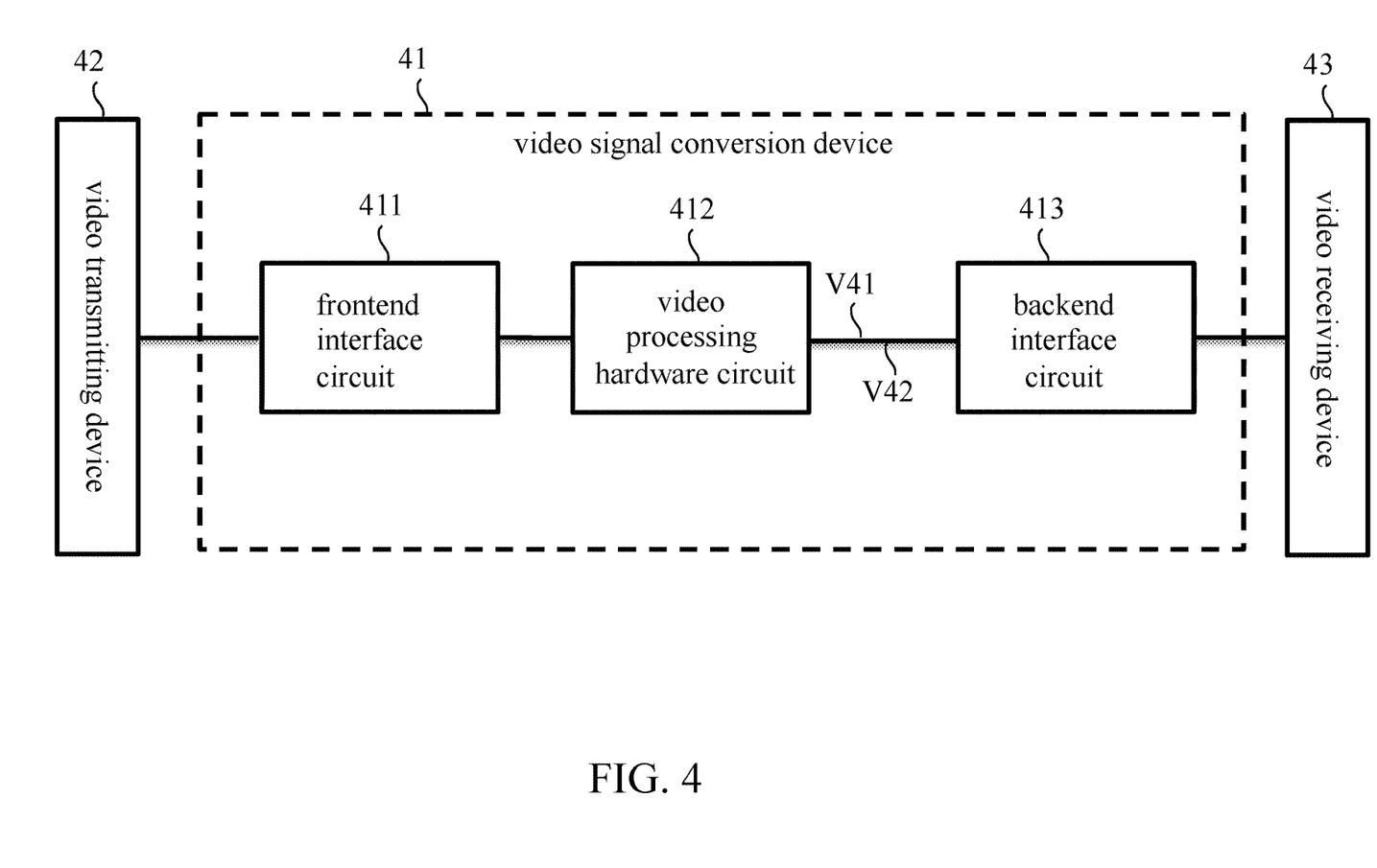
FIG. 4 is a schematic diagram showing a video signal conversion device according to a third embodiment of the invention.

FIG. 4 shows the schematic diagram of the video signal conversion device according to the third embodiment. As shown in FIG. 4, the video signal conversion device 41 is cooperated with the video transmitting device 42 and the video receiving device 43. The video signal conversion device 41 includes a frontend interface 411, a video processing hardware circuit 412 and a backend interface circuit 413. The frontend circuit is electrically connected with video transmitting device 42 to receive the video input signal from the video transmitting device 42, wherein the video input signal is HDR signal. The video processing hardware circuit 412 is electrically connected with frontend circuit 411. According to the video input signal, the video processing hardware circuit 412 outputs the first video output signal V41, wherein, the first video output signal V41 is SDR signal. The backend interface circuit 413 is electrically connected respectively with the video processing hardware circuit 412 and the video receiving device 43, wherein, the backend interface circuit 413 includes a USB video bridge controller. The video receiving device 43 receives the first video output signal V41 from the video processor 412 by the USB video bridge controller.

Continued above, according to HDR video input signal, the video processing hardware circuit 412 outputs the SDR first video output signal V31 for follow-up use by the video receiving device 43, such as storage, display, or series flow, etc., to more fully apply for supporting HDR.

In the embodiment, the video processing hardware circuit 412 may selectively outputs the first video output signal V41 or the second video output signal V42, wherein the second video output signal V42 is HDR signal. In addition, according to the video input signal, the video processing hardware circuit 412 outputs the HDR second video output signal V42. During actual operation, according to HDR video input signal, the video processing hardware circuit 412 outputs the HDR second video output signal V42 by pass-through. Of course, according to the HDR video input signal, the video processing hardware circuit 412 may generate the HDR second video output signal V42 by video operation. These video operations may be, for example, change of resolution/frame rate or other video parameters. Additionally, the backend interface circuit 413 may, for example, selectively output the SDR first video output signal V41 or the HDR second video output signal V42 to the video receiving device 43. Of course, the signal may be temporarily stored in a buffer of the backend interface circuit 413. Even if the video processing hardware circuit 412 selectively outputs the signal V41/V42, by temporary storage in the buffer of the backend interface circuit 413, the SDR first video output signal V41 and the HDR second video output signal V42 may be respectively or substantially synchronously outputted to the video receiving device 43.

According to actual requirements, the frontend circuit 411 may have different design, for example, including a HDMI receiving device and a HDMI shunt. The receiving device and the shunt have been described in the previous embodiment, and not are repeated in this embodiment.

The video receiving device 43 may enable the video processing hardware circuit 412 by the USB video bridge controller of the backend interface circuit 413 to convert the HDR video input signal to the SDR first video output signal V41, for example, the video receiving device 43 transmits relevant command or information to the video bridge controller of the backend interface circuit 413 to control the video processing hardware circuit 412 for video processing by the USB video bridge controller of the backend interface circuit 413. In addition, the video receiving device 43 may enable the video processing hardware circuit 412 by the video bridge controller of the backend interface circuit 413 to selectively output the SDR first video output signal V41 or the HDR second video output signal V42.

Figure 5:
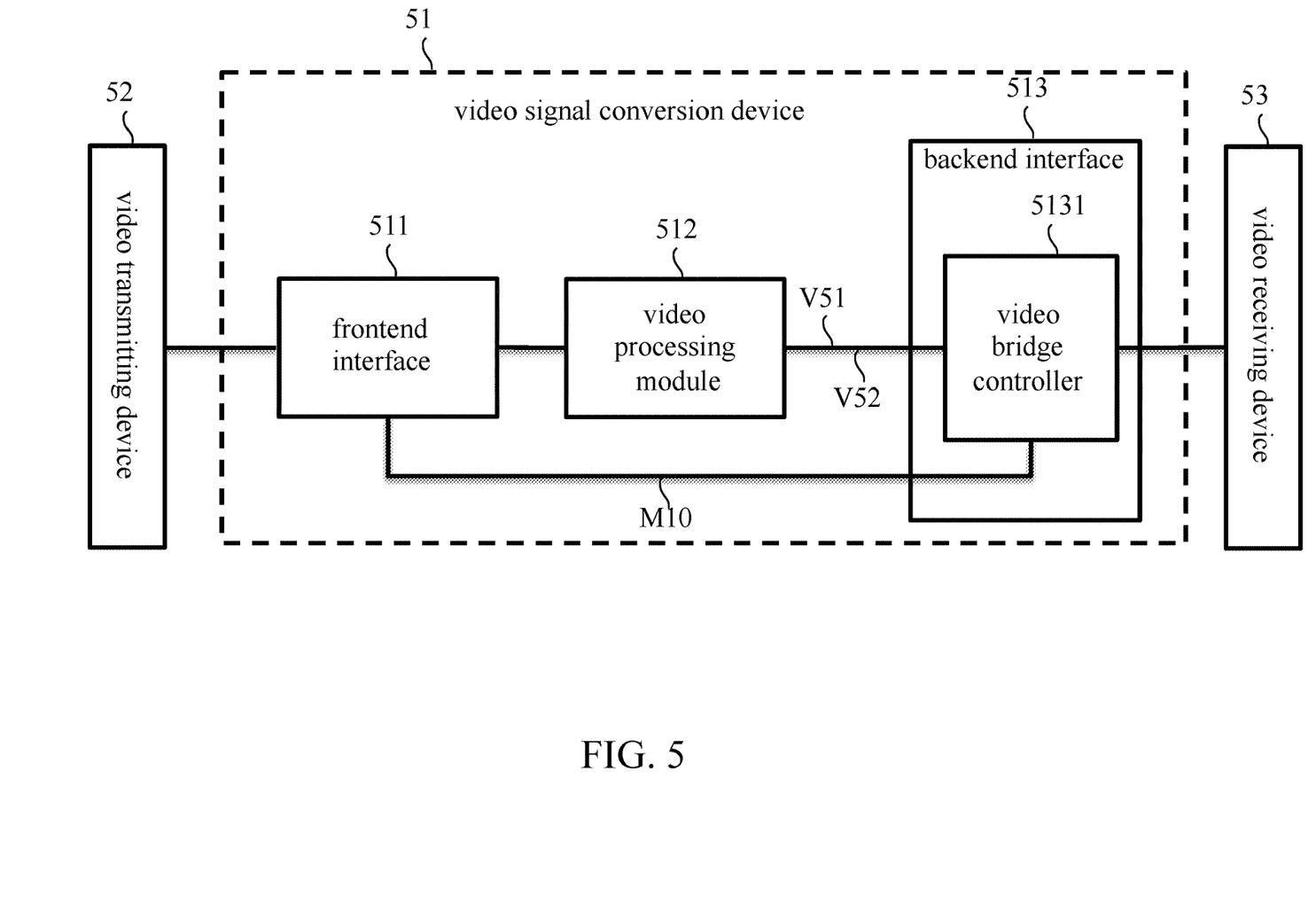
FIG. 5 is a schematic diagram showing a video signal conversion device according to a fourth embodiment of the invention.

FIG. 5 shows the schematic diagram of the video signal conversion device according to the fourth embodiment. As shown in FIG. 5, the video signal conversion device 51 is cooperated with the video transmitting device 52 and the video receiving device 53. The video signal conversion device 51 includes a frontend interface 511, a video processing module 512 and a backend interface 513. The frontend interface 511 is coupled with the video transmitting device 52 to receive the video input signal from the video transmitting device 51, wherein the video input signal is HDR signal. The video processing module 512 is coupled with the frontend interface 511. According to the video input signal, the video processing module 511 outputs the first video output signal V51, wherein, the first video output signal V51 is SDR signal. The backend interface 513 is electrically connected respectively with the video processing module 512 and the video receiving device 53, wherein, the backend interface 513 includes a video bridge controller 5131. The video receiving device 53 receives the first video output signal V51 from the video processing module 512 by the video bridge controller 5131, wherein the video bridge controller 5131 is coupled with the frontend interface 511 to receive the video metadata M10 corresponding to the video input signal from the frontend interface 511 for use by the video receiving device 53.

Continued above, according to HDR video input signal, the video processing module 512 outputs the SDR first video output signal V51 for follow-up use by the video receiving device 53, such as storage, display, or series flow, etc., to more fully apply for supporting HDR.

In this embodiment, the video metadata M10 includes the HDR information on HDR video input signal.

The video bridge controller 5131 may be a USB video bridge controller. The USB video bridge controller 5131 transmits the video metadata M10 to the video receiving device 53 by a universal sequence. In this embodiment, a USB video extension unit (UVC-Extension Unit) or a USB human-interface unit (USB-HID) transmits the video metadata M10 to the video receiving device 53. Additionally, according to actual requirement, with USB framework, a channel is designed on the video receiving device 53 to transmit the video metadata M10 from the backend interface 513 to the video receiving device 53, without limitation to UVC-Extension Unit or USB-HID.

According to conversion signal, the video processing module 512 may convert the HDR video input signal to the SDR first video output signal. The conversion information is related with the HDR information of the video metadata. During actual operation, the conversion information may be obtained by the HDR information and the HDR-SDR conversion function. The conversion information may be known by comparison tables or real-time operations. For the above conversion, actually, for example, it may be SDR video information obtained by adjusting the video information video conversion formula of the conversion information.

In this embodiment, the video processing module 512 may selectively outputs the first video output signal V51 or the second video output signal V52, wherein the second video output signal V52 is HDR signal. Additionally, according to the video input signal, the video processing module 512 outputs the second video output signal V52. During actual operation, according to the HDR video input signal, the video processing module 512 outputs the HDR second video output signal V52 by pass-through. Of course, according to the HDR video input signal, the video processing module 512 may generate the HDR second video output signal V52 by video operation. These video operations may be, for example, change of resolution/frame rate or other video parameters. The backend interface 513 may selectively output the SDR first video output signal V51 or the HDR second video output signal V52 to the video receiving device 53. Of course, a buffer is arranged on the backend interface 513. Even if the video processing module 512 selectively outputs the signal V51/V52, by temporary storage in the buffer of the backend interface 513, the SDR first video output signal V51 and the HDR second video output signal V52 may be respectively or substantially synchronously outputted to the video receiving device 53.

The video receiving device 53 may enable the video processing module 512 by the video bridge controller 5131 of the backend interface 513 to convert the HDR video input signal to the SDR first video output signal V51, for example, the conversion information may be stored in the video bridge controller 5131. When the video receiving device 53 transmits relevant command or information to the USB video bridge controller 5131 of the backend interface 513, the USB video bridge controller 5131 transmits the conversion information to the video processing module 512 so as to control the video processing module 512 for corresponding video processing. Additionally, the video receiving device 53 may enable the video processing module 512 by the USB video bridge controller of the backend interface 513 to selectively output the SDR first video output signal V51 or the HDR second video output signal V52.

In the embodiment, the frontend interface 511 may have different design according to actual requirement, for example, including a HDMI receiving device and a HDMI shunt. The receiving device and the shunt have been described in the previous embodiment, and not are repeated in this embodiment. Additionally, the video bridge controller 5131 may be coupled with the receiving device of the frontend interface 511 to receive the video metadata M10 corresponding to the video input signal from the receiving device of the frontend interface 511.

Figure 6:
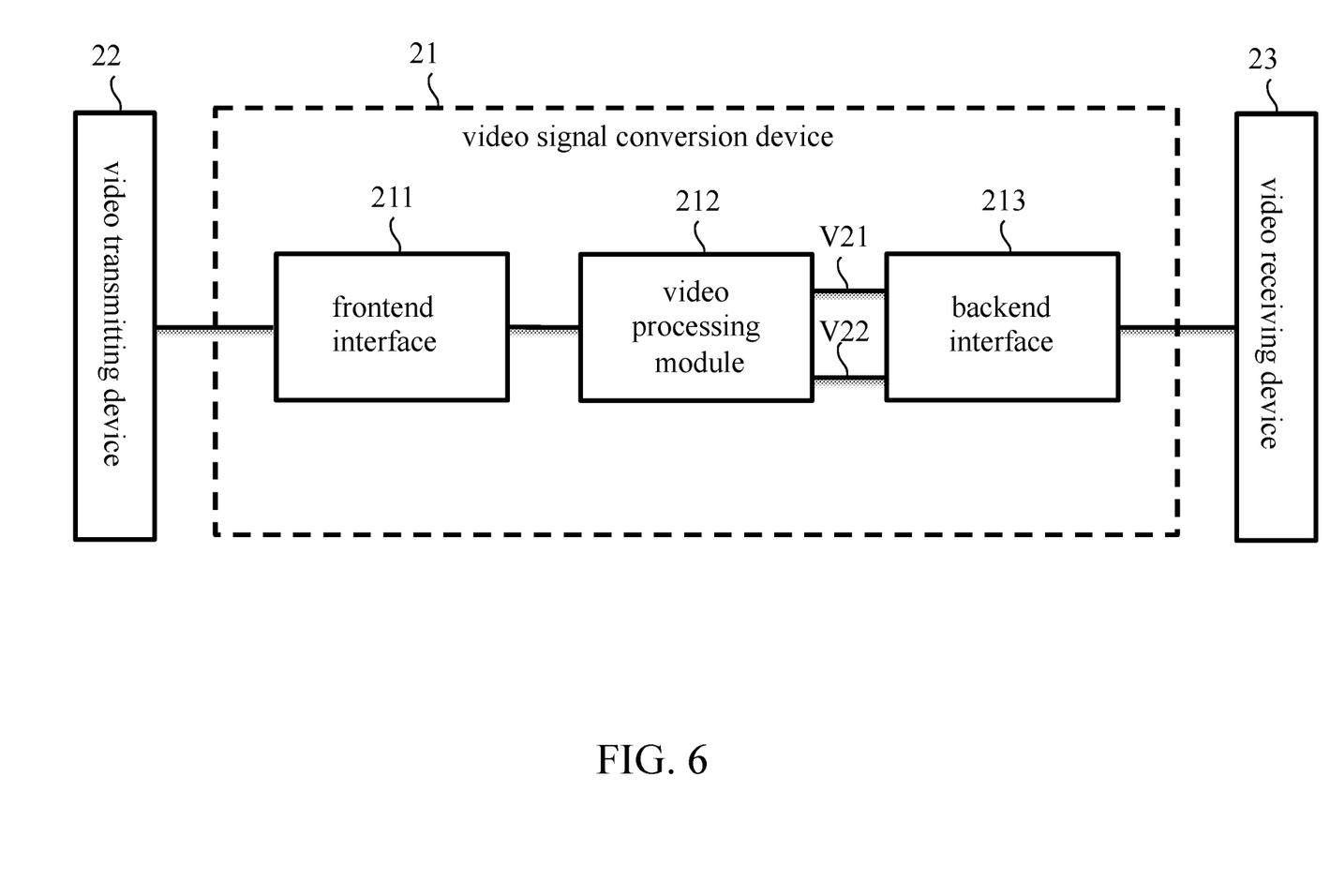
FIG. 6 is a schematic diagram showing a video signal conversion device according to a fifth embodiment of the invention.

FIG. 6 shows the schematic diagram of the video signal conversion device according to the fifth embodiment. As shown in FIG. 6, the video signal conversion device 21 is cooperated with the video transmitting device 22 and the video receiving device 23. The video signal conversion device 21 includes a frontend interface 211, a video processing module 212 and a backend interface 213. The frontend interface 211 is coupled with the video transmitting device 22 to receive the video input signal from the video transmitting device 22, wherein the video input signal is a signal with a first frame rate. The video processing module 212 is coupled with the frontend interface 211. According to the video input signal, the video processing module 212 outputs the first video output signal V21, wherein, the first video output signal V21 is a signal with a second frame rate. The backend interface 213 is respectively coupled with the video processing module 212 and the video receiving device 23, wherein, the video receiving device 23 receives the first video output signal V21 and the second video output signal V22 from the video processing module 212 by the backend interface 213, wherein the second video output signal V22 is a signal with the first frame rate.

As according to the video input signal, the video processing module 212 may output the first video output signal V21 with the second frame rate and the second video output signal V22 with the first frame rate for follow-up use by the video receiving device 23, the video receiving device is more suitable for the video functions operating simultaneously. In this embodiment, for example, the first video output signal V21 with the second frame rate (e.g. low frame rate) may be used to save bandwidth by series flow, while the second video output signal V22 with the first frame rate (e.g. high frame rate) may be stored for the user to use the high frame rate video.

The first frame rate may be higher than the second frame rate, which is not deemed limited. In this embodiment, the first frame rate is equal to or higher than 60 frames/s (FPS) while the second frame rate equal to or lower than 60 frames/s (FPS).

According to the video input signal, the video processing module 212 outputs the second video output signal V22 with the first frame rate. During actual operation, according to the video input signal with the first frame rate, the video processing module 212 outputs the second video output signal V22 with the first frame rate by pass-through. Of course, according to the video input signal with the first frame rate, the video processing module 212 may generate the second video output signal V22 with the first frame rate by video operation. These video operations may be, for example, change of resolution/frame rate or other video parameters. Additionally, the video processing module 212 may, for example, substantially synchronously output the first video output signal V21 with the second frame rate and the second video output signal V22 with the first frame rate. The "substantially synchronously" means smaller time difference within allowable range is deemed as "substantially synchronously". In another embodiment, the video processing module 212 may respectively output the first video output signal V21 with the second frame rate and the second video output signal V22 with the first frame rate. The backend interface 213 may respectively or substantially synchronously output the first video output signal V21 with the second frame rate and the second video output signal V22 with the first frame rate to the video receiving device 23.

The video receiving device 23 may enable the video processing module 212 by the backend interface 213 to convert the video input signal with the first frame rate to the first video output signal V21 with the second frame rate, for example, the video receiving device 23 transmits relevant command or information to the backend interface 113 to control the video processing module 212 for corresponding video processing by the backend interface 213. Additionally, the video receiving device 23 enables the video processing module 212 to substantially synchronously or respectively output the first video output signal V21 with the second frame rate and the second video output signal V22 with the first frame rate by the backend interface 213.

In summary, according to the technical content of the invention, the video signal conversion device can more fully solve the problems that the backend video receiving end does not support HDR or the backend video receiving end requires SDR.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A video signal conversion device, in communication with a video transmitting device and a video receiving device, comprising:
    a frontend interface circuit, which is coupled with the video transmitting device for receiving a video input signal transmitted from the video transmitting device, where the video input signal is HDR signal;
    a video processing hardware circuit, which is coupled with the frontend interface for outputting a video output signal in accordance with the video input signal, where the video output signals include video contents and where the video output signal is SDR signal; and
    a backend interface circuit, which is electrically connected with the video processing hardware circuit and the video receiving device, wherein the video receiving device receives the video output signal by the video processing hardware circuit through the backend interface circuit,
    wherein the backend interface circuit has a video bridge controller, which is PCI-E BUS video bridge controller or USB video bridge controller, wherein the video receiving device receives a PCI-E BUS video output signal or a USB video output signal outputted by the video processing hardware circuit through the video bridge controller.

2. The video signal conversion device of claim 1, wherein the video processing hardware circuit is a FPGA video processor or a SoC video processor, and wherein the video receiving device enables the video processing hardware circuit by the USB video bridge controller to convert the HDR video input signal to the SDR video output signal.

3. The video signal conversion device of claim 1, wherein the video receiving device enables the video processing hardware circuit by the USB video bridge controller to output the video output signal.

4. The video signal conversion device of claim 1, wherein the video receiving device enables the video processing module by the backend interface to convert the HDR video input signal to the SDR video output signal, which includes at least one video content, or outputs the HDR video input signal including at least one video content by pass-through.

5. A video signal conversion device, in cooperation with a video transmitting device and a video receiving device, comprising:
 a frontend interface, which is coupled with the video transmitting device for receiving a video input signal transmitted from the video transmitting device, where the video input signal is HDR signal;
 a video processing module, which is coupled with the frontend interface for outputting a video output signal; and
 a backend interface, which is coupled with the video processing module and the video receiving device, and has a video bridge controller, wherein the video receiving device receives the video output signal outputted by the video processing module through the video bridge controller, and wherein the video bridge controller is coupled with the frontend interface to receive a video metadata corresponding to the video input signal from the frontend interface for using in the video receiving device, and wherein the video bridge controller is a USB video bridge controller transmitting the video metadata to the video receiving device by a universal sequence,
 wherein the USB video bridge controller transmits the video metadata to the video receiving device by a USB video extension (UVC-Extension) unit or a USB human-interface (USB HID) unit.

6. The video signal conversion device of claim 5, wherein the video processing module outputs the video output signal by pass-through, where the video output signal is HDR signal.

7. The video signal conversion device of claim 5, wherein the video receiving device enables the video processing module by the video bridge controller to outputs the video output signal, where the video output signal is HDR signal.

8. The video signal conversion device of claim 5, wherein the video metadata comprises HDR information.

9. The video signal conversion device of claim 5, wherein the backend interface outputs the video output signal by pass-through, where the video output signal includes at least one video content and where the video output signal is HDR signal.

10. The video signal conversion device of claim 5, wherein the frontend interface comprises a shunt coupled with the video transmitting device for receiving the video input signal transmitted from the video transmitting device and shunts the video input signal to the video processing module and another video receiving device.

11. A video signal conversion device, in communication with a video transmitting device and a video receiving device, comprising:
 a frontend interface, which is coupled with the video transmitting device for receiving a video input signal transmitted from the video transmitting device, where the video input signal is a signal with a first frame rate;
 a video processing module, which is coupled with the frontend interface for outputting a first video output signal in accordance with the video input signal with the first frame rate, where the video processing module converts the first frame rate to a second frame rate being smaller than the first frame rate, so that the first video output signal is a signal with the second frame rate; and
 a backend interface, which is coupled with the video processing module and the video receiving device, wherein the video receiving device substantially synchronously receives the first video output signal and a second video output signal outputted by the video processing module through the backend interface, where the second video output signal is a signal with the first frame rate,
 wherein the video processing module substantially synchronously output the first video output signal with the second frame rate and the second video output signal with the first frame rate, where the first frame rate is greater than the second frame rate.

12. The video signal conversion device of claim 11, wherein the video processing module outputs the second video output signal with the first frame rate by pass-through.

13. The video signal conversion device of claim 11, wherein the first video output signal with the second frame rate is to save bandwidth by series flow, while the second video output signal with the first frame rate is stored for the user to use the high frame rate video.

14. The video signal conversion device of claim 11, wherein the first frame rate is equal to or more than 60 frames/s (FPS), the second frame rate is equal to or less than 60 frames/s (FPS).

15. The video signal conversion device of claim 11, wherein the video processing module generates the second video output signal with the first frame rate by video operation, where the video operation is change of resolution rate, frame rate or other video parameters.

16. The video signal conversion device of claim 11, wherein the first video output signal with the second frame rate is SDR signal and the second video output signal with the first frame rate is HDR signal.

17. The video signal conversion device of claim 11, wherein the video receiving device transmits relevant command or information to the backend interface to control the video processing module for corresponding video processing by the backend interface, where the video processing module converts the video input signal with the first frame rate to the first video output signal with the second frame rate.

* * * * *